Oct. 25, 1932.    H. T. BAGGETT ET AL    1,884,965
SEAL RING FOR CONICAL CUTTERS
Filed Oct. 19, 1931
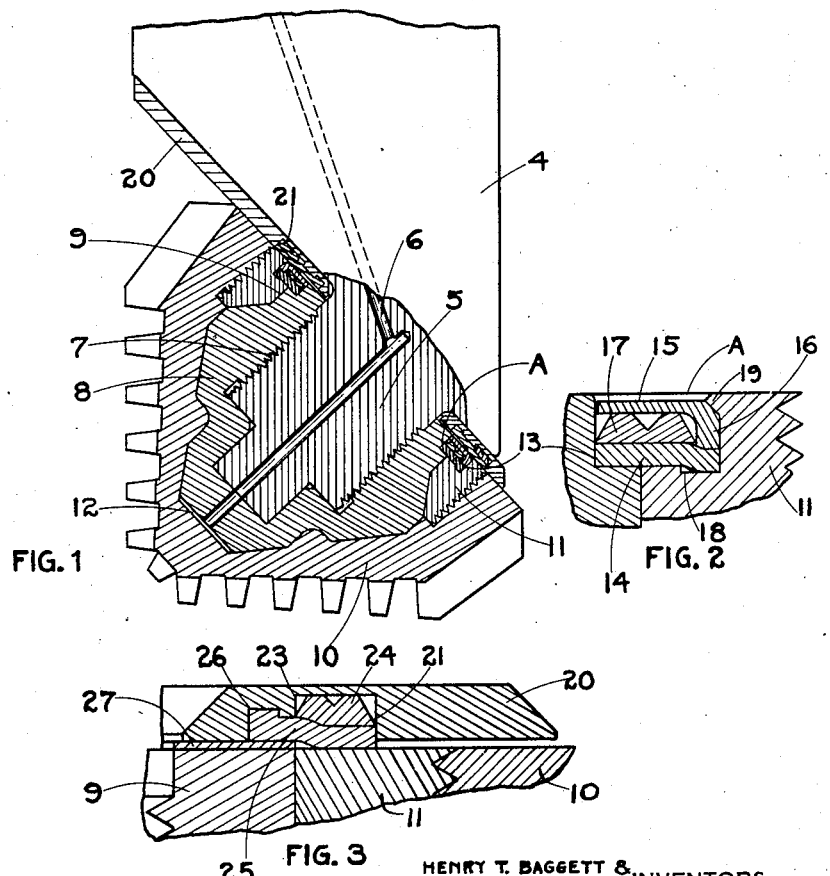
HENRY T. BAGGETT & LEWIS E. GARFIELD  INVENTORS
BY Jesse R. Stone
ATTORNEY Patented Oct. 25, 1932

1,884,965

UNITED STATES PATENT OFFICE

HENRY T. BAGGETT AND LEWIS E. GARFIELD, OF HOUSTON, TEXAS, ASSIGNORS TO HUGHES TOOL COMPANY, OF HOUSTON, TEXAS, A CORPORATION OF TEXAS

SEAL RING FOR CONICAL CUTTERS

Application filed October 19, 1931. Serial No. 569,709.

Our invention relates to cutters for well drills and more particularly to the lubrication thereof.

The cutters on deep well drills operate at the bottom of well bores that are frequently about a mile deep. They roll on bearings that must withstand heavy loads and operate in an atmosphere of mud and grit which is under a static head of liquid averaging over a thousand pounds to the square inch. The lubricant is usually fed to the bearings through lubricant passages through the drill head and the cutter shafts from a reservoir connected with the said head.

Due to the high static fluid pressure of the liquid in the hole outside the cutters, it is found that mud will force itself around the bearings of the cutters and the abrasive material carried by the mud will cause rapid wear of the bearing surfaces of the cutters and their bushings so that they will not last until the teeth upon the cutters are worn out.

We desire to prevent the entrance of mud to the bearings of cutters of the character described and to hold the lubricant on the bearings so that the usual excessive bearing wear will be avoided.

We have as an object to provide a seal ring to be used on the cutter which will seal off the entrance of the mud about the bearings of the cutter.

We also contemplate the use of a sealing means on the washer which is adapted to bear against the cutter and keep out slush from the cutter bearings in use.

In the drawing, Fig. 1 is a side view of a portion of a drill head with a cutter thereon equipped with the invention, the cutter and shaft being in central vertical section.

Fig. 2 is a broken sectional detail of the packing on the cutter. Fig. 3 is a similar view of the seal ring on the washer.

In Fig. 1 the lower end of drill head is indicated at 4. The cutter shaft 5 is formed integral therewith and lubricant may reach the end of the shaft to lubricate the bearing through a channel 6 in the usual manner well known in the art.

The shaft 5 is threaded at 7 to engage with the bushing 8 which is frusto-conical in shape and surrounds the end of the shaft. The forward end of the shaft is reduced in diameter but is unthreaded, forming a support for the end of the bushing.

The bushing 8 is formed with a reduced neck 9 thereon and the cutter 10 is constructed with an inner recess to receive the bushing; and a retaining ring 11 is screwed within the base of the cutter engaging about the neck 9 to hold the cutter rotatably upon the bushing. The cutter is toothed on its outer surface in the usual manner.

When the cutter is mounted for operation upon the shaft as shown, the lubricant will pass from the channel 6 in the bit head through the shaft 5 and through an opening 12 in the bushing to the bearings. The usual difficulty is that the fluid pressure in the hole outside the cutter is so great that the mud will force the lubricant back toward the lubricator and the mud will enter about the bearing surfaces at the base of the cutter and prevent the access of the lubricant to the bearings to a serious degree.

We place a seal ring A in an annular recess 13 formed in the retaining ring and bushing. As seen in Fig. 2 this ring A is, in fact, made up of three parts; an inner washer 14 which is preferably made of leather or similar flexible tough material. There is also an outer ring 15 of metal such as steel. This ring has an inwardly turned flange 16 at its outer margin to bear against the outer edge of the washer 14 and force it into a countersunk groove 18 and thus hold it clamped in position. Between the rings 14 and 15 is a ring 17 of rubber or like compressible material which is preferably corrugated circumferentially on its upper surface so that it may be compressed in thickness and thus serve to better form a seal.

When the seal device A is placed in assembled position in the recess 13 the margin of the recess in the retaining ring is upset at 19 about the steel ring 15 to force the said ring 15 into tight clamping engagement with the two inner rings and to serve also to hold them in place. This upsetting of the material of the retaining ring 11 may be done by spinning of the metal or by the use of a hammer as desired.

This type of seal ring has been found to be particularly effective in preserving a seal at the bearings. The ring rotates with the cutter and we find that the pressure of liquid from the outside tends to preserve the seal and leakage is substantially prevented.

The washer also may be provided with a packing means still further assisting in preventing access of mud to the bearings. The washer 20 is formed with a recess 21 spaced from the shaft 5 and opposite the line of division between the bushing and cutter. In Fig. 3, it will be seen that this recess is deepest at 23 to receive the rubber washer 24. The outer washer 25 is of leather or similar material and is wider than the ring 24. One margin of the leather ring 25 is forced into a groove 26 by the pressure of a shim or washer 27 which fits against the seal ring and the washer 20 opposite the neck 9 of the bushing.

In Fig. 3 it will be noted that the packing in the washer is shown without the use also of the ring A in the cone. When the seal ring in the washer is depended upon to prevent access of mud to the cone bearings or to avoid loss of lubricant, the cone bears strongly against the seal ring and compresses it within the washer. Thus leakage along the bearing surface is largely avoided. When the two sets of packing are used in combination a particularly effective seal is provided. It will thus be possible to prevent the usual wear of abrasive material upon the bushing and make it possible for the cutter to operate until its cutting surface is destroyed without appreciable difficulty with bushing wear.

What we claim as new is:

1. In combination, a head, a shaft integral therewith, a bushing on said shaft, a cutter surrounding the end of said shaft, a washer between said cutter and said head, a seal ring partly in said cutter and partly in said bushing and a compressible packing member positioned in said washer and adjacent said seal ring.

2. A drill head, a shaft thereon, a bearing surface associated with said shaft, a cutter surrounding the end of said shaft and a seal ring fitted within a recess between said bearing surface and said cutter, one edge of said recess being upset to clamp said ring in position.

3. A drill head, a shaft thereon, a bushing surrounding the end of said shaft, a cutter on said bushing, a retaining ring on said cutter, a seal ring fitted within a recess formed partly in said retaining ring and partly in said bushing, said seal ring including a flexible washer, a clamping ring of metal and an intermediate ring of compressible material.

4. A bushing, a cutter rotatable thereon, a recess formed partly in said cutter and partly in said bushing, a seal ring in said recess, including an inner washer of flexible material, a ring of rubber and a ring of rigid material clamping said rubber ring upon said washer.

5. A bushing, a cutter rotatable thereon, a recess formed partly in said cutter and partly in said bushing, a seal ring in said recess, including an inner washer of flexible material, a ring of rubber and a ring of rigid material clamping said rubber ring upon said washer, said rigid ring having an inwardly directed flange engaging said washer.

6. A bushing, a cutter rotatable thereon, a recess formed partly in said cutter and partly in said bushing, a seal ring in said recess, including an inner washer of flexible material, a ring of rubber and a ring of rigid material clamping said rubber ring upon said washer, means upon said rigid ring clampingly engaged with said washer and means on said cutter holding said rigid ring in position.

7. A drill head, a shaft thereon, a bushing on said shaft, a cutter rotatable on said bushing, a washer between said head and said cutter, a packing ring set in a recess in said washer adjacent the end of said cutter and bushing, and resilient means to hold said packing ring against said cutter.

In testimony whereof, we hereunto affix our signatures this the 14th day of October, A. D. 1931.

LEWIS E. GARFIELD.
HENRY T. BAGGETT.